United States Patent [19]

Fujimura et al.

[11] Patent Number: 4,519,355
[45] Date of Patent: May 28, 1985

[54] METHOD OF CONTROL OF INTERNAL COMBUSTION ENGINE VARIABLE SWIRL AIR-FUEL INTAKE SYSTEM WITH DIRECT AND HELICAL INTAKE PASSAGES

[75] Inventors: Kazushiro Fujimura; Toshimitsu Ito, both of Toyota, Japan

[73] Assignee: Toyota Jidosha Kabushiki Kaisha, Aichi, Japan

[21] Appl. No.: 648,976

[22] Filed: Sep. 10, 1984

[30] Foreign Application Priority Data

Apr. 24, 1984 [JP] Japan .................................. 59-82500

[51] Int. Cl.³ .......................... F01L 3/06; F02B 31/00; F02N 17/00
[52] U.S. Cl. ............................... 123/491; 123/188 M; 123/308; 123/432; 123/179 L; 123/179 A
[58] Field of Search .................. 123/188 M, 306, 308, 123/432, 491, 179 L, 179 A

[56] References Cited

U.S. PATENT DOCUMENTS

| | | | |
|---|---|---|---|
| 3,680,532 | 8/1972 | Omori | 123/491 |
| 3,683,871 | 8/1972 | Barr et al. | 123/491 |
| 4,411,226 | 10/1983 | Okumura et al. | 123/308 |
| 4,438,741 | 3/1984 | Okumura et al. | 123/188 M |

FOREIGN PATENT DOCUMENTS

| | | | |
|---|---|---|---|
| EP71272 | 2/1983 | European Pat. Off. | 123/188 M |
| 28525 | 2/1983 | Japan | 123/306 |

*Primary Examiner*—Ira S. Lazarus
*Attorney, Agent, or Firm*—Parkhurst & Oliff

[57] ABSTRACT

A downstream end of an intake port of an internal combustion engine opens to a combustion chamber as a parallel combination of a helical passage which extends helically around and towards its downstream end and a straight passage which extends substantially straight towards its downstream end, with an intake passage valve system being incorporated so as to selectively alter the proportions of intake flow through the straight passage and the helical passage; and a fuel injection valve injects fuel to the intake port. From immediately after starting of the engine for a certain time period the amount of fuel injected through the fuel injection nozzle is increased by a ratio dependent on the temperature of the engine. When this fuel injection amount increase ratio is greater than or equal to a certain value the intake passage switchover control valve system is controlled so as to maximize the proportion of intake flow that passes through the straight passage irrespective of the operational conditions of the engine, while on the other hand when this fuel injection amount increase ratio is less than this certain value the intake passage switchover control valve system is controlled so as to alter the proportions of intake flow that pass through the straight passage and the helical passage, according to the operational conditions of the engine.

2 Claims, 6 Drawing Figures

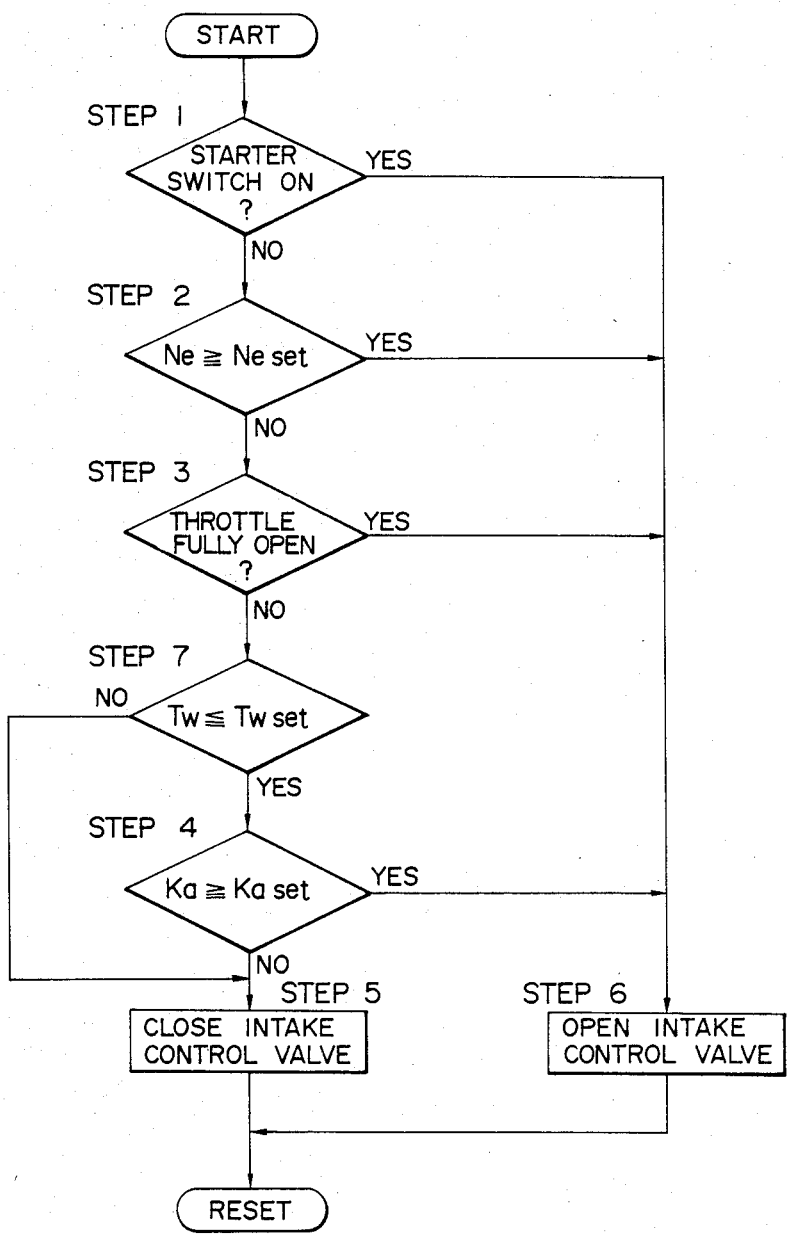

METHOD OF CONTROL OF INTERNAL COMBUSTION ENGINE VARIABLE SWIRL AIR-FUEL INTAKE SYSTEM WITH DIRECT AND HELICAL INTAKE PASSAGES

BACKGROUND OF THE INVENTION

The present invention relates to a method of control of an air-fuel intake system for an internal combustion engine, and more specifically relates to a method of control of an air-fuel intake system for an internal combustion engine which includes an intake port construction including both direct and helical intake passages, wherein the relative amounts of intake flow which pass through said direct intake passage and said helical intake passage can be varied, and which further includes a fuel injection system in which liquid fuel (e.g. gasoline) is directly squirted into the inlet ports of the engine by a fuel injection nozzle.

There are some types of variable swirl intake port construction for an internal combustion engine, which have been developed by the present inventors in the works of the assignee of the present application previously to the development of the present invention, for the inventive concepts of which Japanese Patent Application Serial Nos. 56-51149 (published as Japanese Patent Laying-Open Publication No. 57-165629) and 56-120634 (published as Japanese Patent Laying-Open Publication No. 58-23224) were filed previously to the filing of the Japanese Patent Application relating to the present invention of which priority is being claimed in the present application, and for said inventive concepts of which it is known to the present inventors that U.S. patent application Ser. Nos. 341,911 and 404,145 have been filed claiming the priority of the above identified Japanese patent applications, which incorporate two intake passages formed as leading to the opening past the intake poppet valve into the combustion chamber of the engine, one of said passages leading substantially straight to said opening, and the other leading in a curved or helical path to said opening. The first or the straight one of said intake passages is controlled by an intake control valve mounted at an intermediate position therealong, so that its effective flow resistance is variable; and thus the relative amounts of intake flow which pass through said direct intake passage and said helical intake passage can be varied. In other words, when said intake control valve is closed to the maximum extent (i.e., in general, is fully closed), then a maximum proportion of the intake flow sucked in by the combustion chamber through the intake port construction is sucked in through the helical intake passage and a minimum proportion of said intake flow is sucked in through the straight intake passage, so that as a whole a maximum amount of swirling is imparted to the intake gas sucked into the combustion chamber. On the other hand, when said intake control valve is closed to the minimum extent (i.e., in general, is fully opened), then a minimum proportion of the intake flow sucked in by the combustion chamber through the intake port construction is sucked in through the helical intake passage and a maximum proportion of said intake flow is sucked in through the straight intake passage, so that as a whole a minimum amount of swirling is imparted to the intake gas sucked into the combustion chamber. Such a type of variable swirl intake port construction for an internal combustion engine is schematically shown in FIGS. 1 and 2 of the accompanying drawings, and will be more fully explained in the portion of this specification entitled "DESCRIPTION OF THE PREFERRED EMBODIMENT".

When the intake flow of an internal combustion engine is imparted with a strong swirling, as in the above described case when the aforesaid intake control valve in the straight intake passage is closed as far as possible so that most or all of the intake flow of the engine passes through the helical intake passage, then the apparent flame propagation speed is increased, and it is possible to operate the engine with a very lean mixture, i.e. with a high air/fuel ratio. Further, strong intake swirling helps with stable idling of the engine, so that, other things being equal, the idling speed can be set very low, even when the air/fuel ratio of the mixture being supplied to the engine fluctuates somewhat. On the other hand, the intake volumetric efficiency is reduced, especially during high load engine operation. But in the case when no or very little intake swirling is provided, as in the above described case when the aforesaid intake control valve in the straight intake passage is opened as far as possible so as to combine the flow through said straight intake passage with the flow through the helical intake passage, then the apparent flame propagation speed is lower and the engine cannot be operated on mixture of such a low air/fuel ratio, and the idling speed cannot be set so low and the idling is not so stable, but on the other hand the intake volumetric efficiency is much higher. Thus, in the above-identified prior applications, a general form of control method of the intake control valve has been to close it in the engine operational region from low to medium load, so as to provide high swirling for the gases entering the combustion chamber, and so as to eliminate flow through said straight intake passage and to concentrate flow in said helical intake passage, while on the other hand in the engine operational region from medium to high load it has been practiced to provide low swirling for the gases entering the combustion chamber by opening said intake control valve, so as to promote flow through said straight intake passage while reducing the concentration of flow in said helical intake passage, and so as to increase volumetric efficiency.

Now, this basic form of control method for the intake control valve as described above has the advantages as outlined, but, in the case that such a construction is applied to an internal combustion engine with a fuel injection system in which liquid fuel is directly squirted into the inlet ports of the engine by fuel injection nozzles, the following shortcoming occurs. As the engine is being started up from the cold condition, the intake control valve is opened up fully; and while the engine is operating in the cold condition, i.e. just after the starting up of the engine and while it is warming up, then as usual the intake control valve is closed if the engine load is low and is opened if the engine load is medium to high. This presents no problem with an engine utilizing a carburetor, or with a type of engine with so called single point fuel injection in which fuel is injected by a single fuel injection valve into a point in the intake manifold quite far upstream of the intake ports, because in any case there is already a mist of air-fuel mixture present in the intake ports of the engine whatever is the state of the intake control valve; but in the case of an engine which is equipped with a so called direct fuel injection system in which several fuel injection nozzles are provided much closer to the cylinders of the engine and each squirts injected fuel into the intake manifold quite close upstream of one of the intake ports of the engine incorporating such an intake control valve, then some of the liquid fuel in the squirt of injected fuel tends to strike the intake control valve; and this makes the responsiveness of fuel supply to the engine to be bad. Particularly in the case of operation under low load with a weak mixture, with the air/fuel ratio of the air-fuel mixture being supplied to the engine greater than about 20, then problems occur. It can be practiced to provide an increase of the air/fuel ratio of the air-fuel mixture by an amount depending on the cooling water temperature of the engine, i.e. to provide post-starting fuel increase or choking of the engine; but then when the intake control valve is closed under cold engine running low engine load conditions some of this injected fuel does not get into the combustion chamber of the engine immediately, and may adhere to and around the intake control valve in liquid form and enter the combustion chamber in gobs at various poorly defined later times, with the atomization of the fuel being adversely affected, thus causing irregular engine revolution speed, poor idling and engine faltering, poor drivability, bad responsiveness, low quality of exhaust emissions, and possibly even stalling in the case that the temperature of the engine during the initial running period after starting is less than zero degrees C.

SUMMARY OF THE INVENTION

Thus, in the case of utilization of such a variable swirl intake port construction for an internal combustion engine, a requirement has arisen for a method of control which is particularly well adapted thereto.

Accordingly, it is the primary object of the present invention to provide a method of control of a variable swirl type air-fuel intake system for an internal combustion engine of the type described above, which avoids the above identified problems.

It is a further object of the present invention to provide such a method of control of a variable swirl type air-fuel intake system for an internal combustion engine, which provides very good atomization of gasoline which is being sucked in through said variable swirl intake port construction, even during cold engine operation.

It is a further object of the present invention to provide such a method of control of a variable swirl type air-fuel intake system for an internal combustion engine, which provides very good atomization of gasoline, even during engine operation with an enriched air-fuel mixture just after starting up.

It is a further object of the present invention to provide such a method of control of a variable swirl type air-fuel intake system, which does not run the risk of undue collection of droplets of gasoline on the walls of said variable swirl intake port construction, or on the intake control valve.

It is a further object of the present invention to provide such a method of control of a variable swirl type air-fuel intake system, which does not run the risk of uneven and unpredictable sucking off of quantities of gasoline which have accumulated on the walls of said variable swirl intake port construction into the combustion chambers of the engine.

It is a further object of the present invention to provide such a method of control of a variable swirl type air-fuel intake system, which avoids large fluctuations in the air/fuel ratio of the air-fuel mixture which is being sucked into the combustion chambers of the internal combustion engine.

It is a further object of the present invention to provide such a method of control of a variable swirl type air-fuel intake system for an internal combustion engine, which avoids surging or faltering of the engine during the engine warming up period.

It is a further object of the present invention to provide such a method of control of a variable swirl type air-fuel intake system for an internal combustion engine, which provides good responsiveness to load change of the engine, while the engine is warming up.

It is a yet further object of the present invention to keep the drivability of the engine high during the warming up process.

It is a yet further object of the present invention to prevent poor idling and stalling of the engine while it is still cold.

It is a yet further object of the present invention to promote the quality of the exhaust emissions of the engine.

Now, according to the most general aspect of the present invention, the abovementioned object is accomplished by, for an air-fuel intake system, incorporated in an internal combustion engine having a cylinder head which defines a combustion chamber, comprising an intake port a downstream end of which opens to said combustion chamber and which includes a helical passage which extends helically around and towards its said downstream end and a straight passage which extends substantially straight towards its said downstream end, a fuel injection nozzle which injects fuel into said intake port, and an intake passage switchover control valve system which is controllable so as to selectively alter the proportions of intake flow that pass through said straight passage and said helical passage: a method of control, wherein from immediately after starting of the engine for a certain time period the amount of fuel injected through said fuel injection nozzle is increased by a ratio dependent on the temperature of the engine, and wherein: when said fuel injection amount increase ratio is greater than or equal to a certain value, said intake passage switchover control valve system is controlled so as to maximize the proportion of intake flow that passes through said straight passage, irrespective of the operational conditions of the engine; while when said fuel injection amount increase ratio is less than said certain value, said intake passage switchover control valve system is controlled so as to alter the proportions of intake flow that pass through said straight passage and said helical passage, according to the operational conditions of the engine.

According to such a control method, when the fuel injection amount increase ratio is greater than or equal to said certain value, then the flow through the straight passage of the intake port is maximized, and this means that there is no risk of quantities of liquid fuel adhering to the sides of the intake port construction or to the intake passage switchover control valve system. Thus, the risk is not run of uneven and unpredictable sucking off of quantities of gasoline which have accumulated on the walls of said variable swirl intake port construction into the combustion chambers of the engine, and thereby large fluctuations in the air/fuel ratio of the air-fuel mixture which is being sucked into the combustion chambers of the internal combustion engine are avoided, thus precluding surging or faltering of the engine during acceleration or deceleration before it has properly warmed up, and providing good responsiveness thereof and engine revolution speed stability during the warming up process. On the other hand, when the fuel injection amount increase ratio is less than said certain value, then the intake passage switchover control valve system is so controlled as to keep the proportions of intake flow that pass through said straight passage and said helical passage most appropriate for the current operational conditions of the engine, and this as explained above allows the expansion of the allowable operating limits of air/fuel ratio of the engine, without deteriorating drivability thereof, and thereby, without major modifications to the combustion chamber of the engine or to the valve system thereof, it is possible to operate the engine on a leaner mixture, and thus fuel economy of the engine is promoted, as well as the quality of the exhaust emissions of the engine.

The problem of the delaying of fuel getting into the combustion chamber of the engine, i.e. of liquid fuel adhering to the sides of the intake port construction or to the intake passage switchover control valve system, is only in practice severe when the temperature of the engine is less than about 0° C.; and thus, as a modification of the basic concept of the present invention outlined above, if the temperature of the engine is greater than a certain value, even during the provision of starting fuel increase ratio, it is a useful idea to control the intake passage switchover control valve system so as to alter the proportions of intake flow that pass through said straight passage and said helical passage, according to the operational conditions of the engine, in order to obtain efficient combustion by the provision of high swirling, when appropriate.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are given purely for the purposes of explanation and exemplification only, and are not intended to be limitative of the scope of the present invention in any way, since the scope of the present invention is to be defined by the legitimate and proper scope of the appended claims. In the drawings:

FIG. 6 is similar to FIG. 5, and is a flowchart of the control routine for such a vacuum switching valve, according to the second preferred embodiment of the control method of the present invention.

DESCRIPTION OF THE PREFERRED EMBODIMENTS

Figure 1:
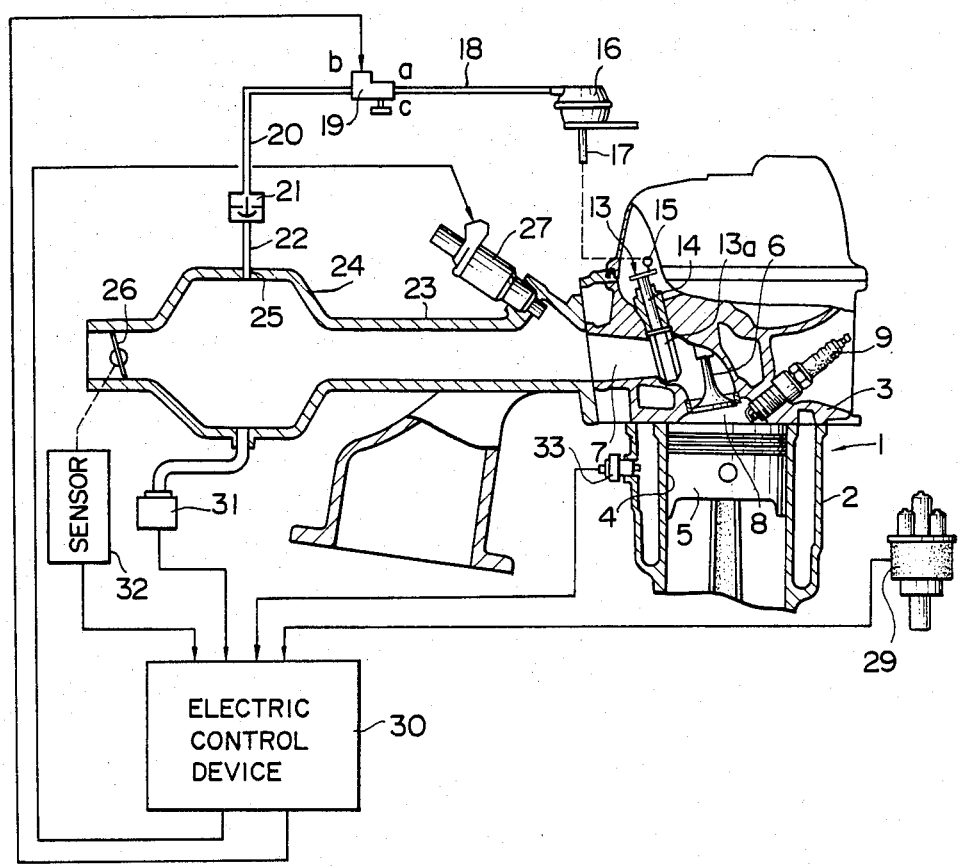
FIG. 1 is a longitudinal sectional view showing part of an internal combustion engine, which is equipped with an air-fuel intake system to be controlled according to either of the preferred embodiments of the present invention which will be described, the intake port construction of said engine incorporating a direct intake passage and a helical intake passage, as generally explained above.

The present invention will now be described with reference to the preferred embodiments thereof, and with reference to the appended drawings. Referring to FIG. 1, the reference numeral 1 denotes the internal combustion engine as a whole, and 2 is the cylinder block thereof, while 3 is its cylinder head. A piston 5 reciprocates in a bore 4 defined in the cylinder block 2, and between the cylinder head 3 and the piston 5 a combustion chamber 8 is defined. A spark plug 9 is fitted so as to provide ignition for fuel-air mixture in the combustion chamber 8.

First, the intake port construction of the internal combustion engine 1 shown in the drawing, which is of the sort described above incorporating a direct intake passage and a helical intake passage, will be explained in more detail. An intake port 7 is defined generally as a hole through the cylinder head 3, said intake port 7 leading from its upstream end which is an opening in the side wall of the cylinder head 3 to its downstream end which is an opening into the combustion chamber 8. The upstream end of the intake port 7 is connected to the downstream end of an intake manifold 23, and in the part of the cylinder head 3 which defines the circumferential periphery of the downstream end of the intake port 7 there is set a valve seat. The valve stem of an intake poppet valve 6 of a per se well known type is fitted in a valve guide which is set into the cylinder head 3; and the head portion of the intake poppet valve 6 cooperates with the intake valve seat in a per se well known way selectively either to interrupt the opening through this intake valve seat and discommunicate the intake port 7 from the combustion chamber 8 or to open said opening through said intake valve seat and communicate the intake port 7 with said combustion chamber 8. An exhaust port, an exhaust valve, and an exhaust valve seat are provided in the cylinder head 3, but they are not shown.

The shape of the intake port 7, etc., will now be explained in brief detail. As a whole, said intake port 7 starts off at its upstream end as substantially straight, and becomes more and more bent along its downstream extent, and near its downstream end it is very substantially bent. The downstream portion of the roof of said intake port 7 (i.e. its side opposite to the valve seat) is formed with a longitudinally extending ridge or vane 10. The vane 10 has one side wall which defines in cooperation with the side wall of the intake port 7 a first intake passage 11, and another side wall which defines in cooperation with the other side wall of the intake port 7 a second intake passage 12. The second intake passage 12 is substantially straight in its extent as leading from an upstream part of the intake port 7 (where the vane 10 substantially starts) to the opening through the valve seat which leads to the combustion chamber 8, so that flow of intake gas (i.e. air-fuel mixture) passing down said second intake passage 12 from said upstream part of the intake port 7 is introduced into said combustion chamber 8 without much swirl being imparted thereto. On the other hand, the first intake passage 11 leads in a helical fashion from said upstream part of the intake port 7 to said opening through the valve seat which leads to the combustion chamber 8, so that flow of gas passing down said first intake passage 11 from said upstream part of the intake port 7 is introduced into said combustion chamber 8 with very substantial swirl being imparted thereto. In fact, in this particular construction, the two intake passages 11 and 12 are not completely separated from one another, since the vane 10 does not extend completely across the intake port 7 (this cannot be seen in the figures, since the vane 10 does not fall in the sectional plane of FIG. 1); but this need not present any substantial problem.

An intake passage switchover control valve assembly 13 is provided for controlling the flow resistance of the second intake passage 12, i.e. of the straight one of the intake passages. This valve assembly 13 includes a valve element 13a of a flat paddle shape or butterfly which extends across the straight intake passage 12, which is fixed to a valve shaft 14 which is rotatably supported in a valve casing which is fixedly mounted in the cylinder head 3. A drive lever 15 is fixed to the protruding end of the valve shaft 14, so that when said drive lever 15 is rotated (by a drive system which will be explained hereinafter) the valve shaft 14 and the valve element 13a are likewise rotated and the orientation of the valve element 13a in the second intake passage 12 alters, thus opening or closing said second or straight intake passage 12. In one of its positions the valve element 13a substantially completely closes the second intake passage 12, and when on the other hand the valve element 13a, the valve shaft 14, etc., are rotated through about 90° from this position, then the valve element 13a leaves said second intake passage 12 substantially unobstructed.

Thus, considering the operation when the internal combustion engine is running: when the butterfly valve element 13a of the valve assembly 13 is in its said position to substantially completely close the second straight intake passage 12, which will henceforward be termed its first position, then most of the intake flow through the intake port 7 passes down the first or helical intake passage 11 (except for some of said flow which passes over the vane 10), and this intake flow is given a very strong swirling action by the curved helical shape of this first intake passage 11, as it passes through the opening in the valve seat into the combustion chamber 8. Accordingly, the apparent flame speed in the combustion chamber 8 is increased by this swirling of the fuel/air mixture therein. Accordingly the combustion speed is relatively high. But on the other hand the resistance to flow of the intake port 7 as a whole, in this operational mode, is rather high.

But when the butterfly valve element 13a of the valve assembly 13 is rotated by 90° from its said position, so as to substantially completely open the second straight intake passage 12, which will henceforward be termed its second position, then a large proportion of the intake flow through the intake port 7 passes down said second straight intake passage 12, although a minor part will still pass down the first or helical intake passage 11 (and also some of said flow will still pass over the vane 10), and the intake flow through this second straight intake passage 12 is not given any strong swirling action, as it passes through the opening in the valve seat into the combustion chamber 8, since this intake passage 12 is straight; although the minor portion of the intake flow which is still passing down the first intake passage 11 is still imparted with some swirl by the curved shape of this first intake passage 11. Accordingly, as a whole the intake flow into the combustion chamber 8 does not swirl very much, so that the apparent flame speed in the combustion chamber 8 is lower than in the previous case. Further, the combustion speed is relatively low. But on the other hand the resistance to flow of the intake port 7 as a whole, in this operational mode, is much lower.

Finally, as a matter of course, when the butterfly valve element 13a of the valve assembly 13 is rotated to an intermediate position between its said first position and its said second position, so as to partly open the second straight intake passage 12, then a medium proportion of the intake flow through the intake port 7 passes down said second straight intake passage 12, and another medium part will still pass down the first or helical intake passage 11 (and also some of said flow will still pass over the vane 10); and, while the portion of the intake flow which is passing through this second straight intake passage 12 is not being given any strong swirling action as it passes through the opening in the valve seat into the combustion chamber 8, since this intake passage 12 is straight, on the other hand the portion of the intake flow which is still passing down the first intake passage 11 is still imparted with some swirl by the curved shape of this first intake passage 11. Accordingly, as a whole the intake flow into the combustion chamber 8 is imparted with a medium amount of swirl, so that the apparent flame speed in the combustion chamber 8 is intermediate between the two extreme cases described above. Further, the combustion speed is also intermediate. Also the resistance to flow of the intake port 7 as a whole, in this intermediate operational mode, is intermediate.

The butterfly valve element 13a is driven, via the valve shaft 14 and the drive lever 15, by an actuator rod 17 which extends from a vacuum operated diaphragm actuator 16, and this actuator 16, according to selective supply of actuating vacuum to it, operates so as to move the butterfly valve element 13a of the valve assembly 13 either to its above described second position, in which it substantially completely opens the second straight intake passage 12 so that as described above a large proportion of the intake flow through the intake port 7 passes down said second straight intake passage 12 with a minor part still passing down the first or helical intake passage 11, or to its above described first position, in which it substantially completely closes the second straight intake passage 12 so that as described above a large proportion of the intake flow through the intake port 7 passes down said first or helical intake passage 11. In detail, when a vacuum chamber (not particularly shown) of the vacuum actuator 16 is supplied with a vacuum value higher (i.e. of lower absolute pressure) than a certain predetermined value, then the rod 17 moves the element 13a of the valve assembly 13 to its first position in which it closes the straight intake passage 12, and on the other hand when said vacuum chamber of the vacuum actuator 16 is supplied with a vacuum value lower (i.e. of higher absolute pressure) than said certain predetermined value, then the rod 17 moves the element 13a of the valve assembly 13 to its second position in which it opens the straight intake passage 12.

The vacuum actuator 16 is selectively supplied with actuating vacuum through a vacuum conduit 18 from a port "a" of an electromagnetic vacuum switching valve 19. This electromagnetic vacuum switching valve 19 has two other ports "b" and "c". The port "b" is communicated to a vacuum port 25 opening into an anti surge tank 24 provided upstream of the intake manifold 23 via a conduit 20, a one way valve 21, and another vacuum conduit 22, and thus receives a continuous supply of manifold vacuum while the engine 1 is running, while the port "c" is communicated to the atmosphere. When the electromagnetic vacuum switching valve 19 is not supplied with actuating electrical energy its port "a" is communicated to its port "c" while its port "b" is communicated to no other port, while on the other hand when the electromagnetic vacuum switching valve 19 is supplied with actuating electrical energy its port "a" is communicated to its port "b" while its port "c" is communicated to no other port.

Figure 2:
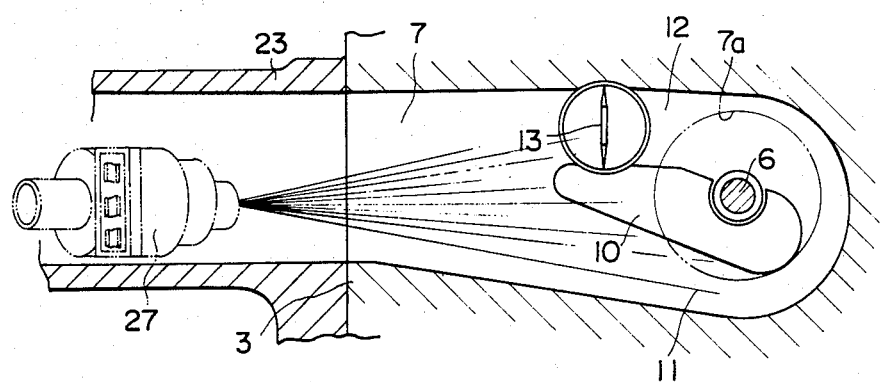
FIG. 2 is a schematic sectional view through said intake port construction of the internal combustion engine of FIG. 1, taken in a plane substantially perpendicular to the cylinder bore of said engine.

At the intake side of the anti surge tank 24 is rotatably mounted a throttle valve 26, and a fuel injection nozzle 27 opens into a downstream part of the intake manifold 23 so as, when supplied from a supply system not particularly shown with pressurized fuel (such as gasoline), and when opened, to direct a spirt of injected fuel in an amount corresponding to the desired fuel injection amount into the intake manifold 23 in a direction, as best seen in FIG. 2, to largely pass into the first or helical intake passage 11, although inevitably some of this injected spirt of fuel passes into the second or straight intake passage 12. In other words, the fuel injection nozzle 27 is somewhat offset from the center line of the intake manifold 23, towards the side of the first or helical intake passage 11.

An electronic control device 30 supplies actuating electrical control signals for the opening and closing of the fuel injection nozzle 27 and for the actuation of the electromagnetic vacuum switching valve 19, and possibly for other devices. This electronic control device 30 receives input of information from an accelerator pedal opening amount sensor 32 which is coupled to the movement of the throttle valve 26, from an intake system pressure sensor 31 which is fed with the pressure within the surge tank 24, from the engine cooling water temperature sensor 7 mounted to the cylinder block 2 of the engine 1, and from a timing signal sensor which is fitted to the distributor 29 of the engine 1. Based upon this information, and possibly upon other information which it may receive, the electronic control device 30, which in these preferred embodiments of the present invention comprises a microcomputer which operates according to a stored program in its memory, calculates the output signals for the opening and closing of the fuel injection nozzle 27, i.e. for fuel injection, and for the actuation of the electromagnetic vacuum switching valve 19, i.e. for the control of the intake passage switchover control valve assembly 13.

Figure 3:
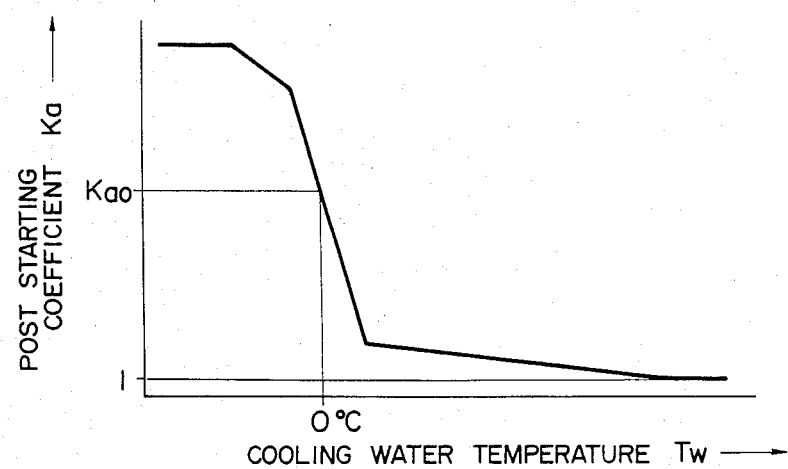
FIG. 3 is a graph showing cooling water temperature of the engine along the horizontal axis and the initial value of a post starting correction coefficient Ka along the vertical axis.
Figure 4:
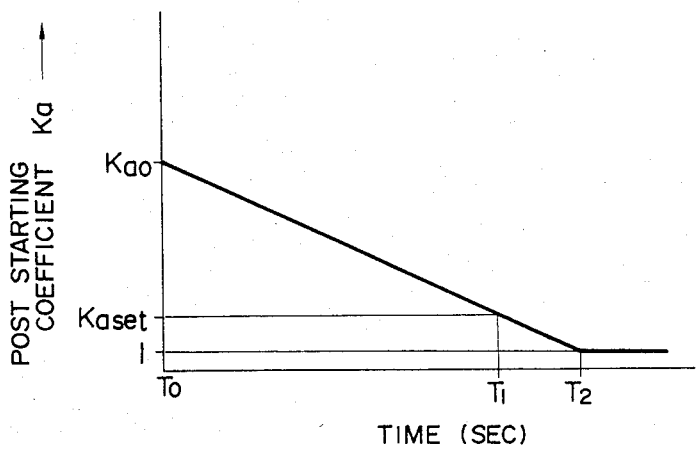
FIG. 4 is a graph showing the value of this post starting correction coefficient Ka along the vertical axis and the value of time along the horizontal axis.

The method of control thus provided by the electronic control device 30 for the amount of fuel for injection through the fuel injection nozzle 27 will now be described, with particular reference to the graphs shown in FIGS. 3 and 4. The memory (such as read only memory or ROM) of the electronic control device 30 has stored in it values for the basic fuel injection time Tp as a function of the pressure in the intake manifold, only, i.e. as a function of the output of the intake system pressure sensor 31 which is related to the amount of air inhaled into the engine per one cylinder stroke, and corrects this basic fuel injection time Tp to obtain the actual fuel injection time Tr by using the formula $Tr = Tp \times Ka \times Kw + Tv$, where Ka is a post starting correction coefficient, Kw is an engine warming correction coefficient, and Tv is the non effective injection time. The post starting correction coefficient Ka is varied with time, as follows. The initial value KaO of Ka is determined at the instant that the starter actuation switch for the engine goes from the ON position to the OFF position, i.e. when the engine cranking is completed and the engine has fired, and at this instant the value KaO is determined according to the temperature of the cooling water of the internal combustion engine 1, as sensed by the engine cooling water temperature sensor 7, as illustrated in FIG. 3, which is a graph showing said cooling water temperature along the horizontal axis and the value KaO along the vertical axis (in this figure, the exemplary starting temperature of 0° C. is illustrated). Thus, the initial value KaO of Ka is the larger, the colder is the initial starting state of the engine 1. Thereafter, as illustrated in FIG. 4, which is a graph showing the value of Ka along the vertical axis and the value of time along the horizontal axis, the value of Ka is decreased at a certain fixed rate, until Ka becomes 1 at the time point T2, when the value of Ka is stabilized at 1 and does not change henceforward. Thus, the lower is the initial water temperature of the engine 1, the higher is the value of the post starting correction coefficient Ka, and the longer post starting correction is applied for.

The method of control for the electromagnetic vacuum switching valve 19, i.e. for the control of the intake passage switchover control valve assembly 13, provided by the electronic control device 30 according to the first preferred embodiment of the control method of the present invention, will now be described in more detail, with reference to FIG. 5 which is a flowchart of the subroutine stored in said control device 30 for the actuation of said vacuum switching valve 19.

In step 1 after the start of the subroutine, a decision is made as to whether the starter switch is ON or not; if it still is, then the flow of control passes to step 6, in which the electronic control device 30 outputs a signal for opening the intake passage switchover control valve assembly 13 to its maximum amount; and then the subroutine comes to an end. On the other hand, if the starter switch is now OFF, then control passes to step 2, in which a decision is made as to whether the engine revolution speed Ne is greater than or equal to a predetermined value Neset or not; if it is, then again control passes to step 6. On the other hand, if Ne is less than Neset, then control passes to step 3, in which a decision is made as to whether the throttle valve 26 is fully open or not; if it is, then again control passes to step 6. On the other hand, if the throttle valve is not fully open, then control passes to step 4, in which a decision is made as to whether the current value of the post starting correction coefficient Ka is greater than or equal to a predetermined value Kaset (q.v. FIG. 4) or not; if it is, then again control passes to step 6. On the other hand, if the post starting correction coefficient Ka has by now become to be less than Kaset, then control passes to step 5, in which the electronic control device 30 outputs a signal for closing the intake passage switchover control valve assembly 13 to its maximum amount; and then the subroutine comes to an end.

The effect of this control method is of course to open the valve assembly 13 to its maximum amount while starting is taking place; and also, after the engine has started, the valve assembly 13 is closed only if the engine revolution speed Ne is less than the predetermined value Neset and also the throttle valve 26 is not fully open and also the value of the post starting correction coefficient Ka has by now become to be less than Kaset. In other words, as stated above, the amount of fuel injected to the engine 1 is increased by the ratio Ka which depends on the cooling water temperature of the engine 1, and, if this fuel injection amount increase ratio Ka is greater than or equal to a certain value, then the intake passage switchover control valve assembly 13 is opened regardless of the operational conditions of the engine 1—i.e. even if the engine revolution speed Ne is higher than Neset (high speed operation) or the throttle valve 26 is fully open (full load operation); whereas, on the other hand, if this fuel injection amount increase ratio Ka is less than said certain value, then the intake passage switchover control valve assembly 13 is opened or closed according to the operational conditions of the engine 1. Thereby, for a certain time period after starting of the engine, the post starting correction coefficient Ka allows a rich mixture to be introduced promptly into the combustion chambers 8 of the engine 1, and definitely during this time low swirling is provided for the gases entering the combustion chamber by the opening of the intake control valve assembly 13, so as to promote flow through said straight intake passage while reducing the concentration of flow in said helical intake passage, and so as to increase volumetric efficiency, thereby stabilizing the engine revolution speed immediately after starting the engine and thus improving engine runnability and avoiding temporary drops in engine revolution speed immediately after starting.

For example, if the temperature Tw of the engine cooling water when the engine is started is 0° C., then the initial value KaO of Ka is determined as shown in FIG. 3, and the value of Ka is then smoothly diminished from this value KaO with time, as shown in FIG. 4, until it reaches unity at time T2, after which it is not further changed. And, until the value of Ka becomes less than the value Kaset, i.e. until the time T1 in FIG. 4, then the intake control valve assembly 13 is definitely opened to its maximum amount, irrespective of any operational parameters of the engine 1. Thereby, problems relating to fuel adhering to and around the intake control valve assembly 13 in liquid form and entering the combustion chamber 8 is gobs at various poorly defined later times are avoided, and accordingly the injected fuel is supplied into the combustion chamber of the engine immediately and properly, and the proper air/fuel ratio of the air-fuel mixture is maintained. On the other hand, when the value of the post starting correction coefficient Ka becomes less than the value Kaset, i.e. after the time T1, then, if and only if also the engine revolution speed is less than the predetermined value Neset and further the throttle valve 26 is not fully open, the intake control valve assembly 13 is closed, so as to provide strong swirling to the air-fuel mixture being sucked into the combustion chamber 8 and thus to increase flame propagation speed and allow operation of the engine 1 on a weak air/fuel ratio mixture.

As a particular case of this first embodiment, the value of Kaset could be unity, in which case as long as the post starting fuel correction is being carried out the intake control valve assembly 13 is definitely kept open.

Figure 5:
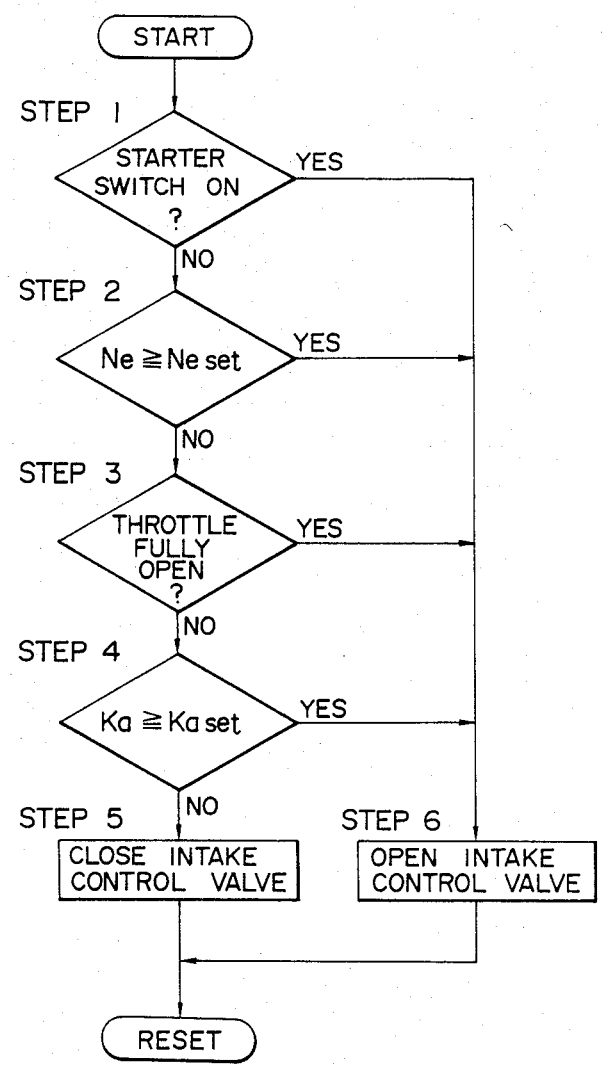
FIG. 5 is a flowchart of a routine stored in a control device for the actuation of a vacuum switching valve incorporated in said intake port construction of the engine of FIG. 1, according to the first preferred embodiment of the control method of the present invention.

FIG. 6 shows the flowchart of the second preferred embodiment of the control method of the present invention, in a fashion similar to FIG. 5 for the first embodiment. In this second embodiment, between step 3 and step 4 there is inserted an additional step 7, in which a decision is made as to whether the cooling water temperature Tw of the engine 1 is less than or equal to a certain value Twset, or not. Thus, after the engine revolution speed Ne has been tested against Neset and the throttle valve 26 has been tested as to whether it is fully opened or not, as in the first embodiment, then, if Tw is less than or equal to Twset, step 4 is proceeded to and the intake control valve assembly 13 is opened or closed, respectively according as to whether the current value of Ka is greater than or equal to Kaset, or not; but, if Tw is greater than Twset, then definitely the intake control valve assembly 13 is closed to provide intake swirl and thus to provide good engine drivability, thus in this case ignoring the criterion as to whether the post starting correction coefficient Ka has become less than Kaset or not. This optional modification of the method of the present invention provides additional flexibility to the control process.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. For an air-fuel intake system, incorporated in an internal combustion engine having a cylinder head which defines a combustion chamber, comprising an intake port a downstream end of which opens to said combustion chamber and which includes a helical passage which extends helically around and towards its said downstream end and a straight passage which extends substantially straight towards its said downstream end, a fuel injection nozzle which injects fuel into said intake port, and an intake passage switchover control valve system which is controllable so as to selectively alter the proportions of intake flow that pass through said straight passage and said helical passage:
   a method of control, wherein from immediately after starting of the engine for a certain time period the amount of fuel injected through said fuel injection nozzle is increased by a ratio dependent on the temperature of the engine, and wherein:
   when said fuel injection amount increase ratio is greater than or equal to a certain value, said intake passage switchover control valve system is controlled so as to maximize the proportion of intake flow that passes through said straight passage, irrespective of the operational conditions of the engine; while
   when said fuel injection amount increase ratio is less than said certain value, said intake passage switchover control valve system is controlled so as to alter the proportions of intake flow that pass through said straight passage and said helical passage, according to the operational conditions of the engine.

2. For an air-fuel intake system, incorporated in an internal combustion engine having a cylinder head which defines a combustion chamber, comprising an intake port a downstream end of which opens to said combustion chamber and which includes a helical passage which extends helically around and towards its said downstream end and a straight passage which extends substantially straight towards its said downstream end, a fuel injection nozzle which injects fuel into said intake port, and an intake passage switchover control valve system which is controllable so as to selectively alter the proportions of intake flow that pass through said straight passage and said helical passage:

a method of control, wherein from immediately after starting of the engine for a certain time period the amount of fuel injected through said fuel injection nozzle is increased by a ratio dependent on the temperature of the engine, and wherein:

when the temperature of said engine is less than or equal to a certain value and also said fuel injection amount increase ratio is greater than or equal to a certain value, said intake passage switchover control valve system is controlled so as to maximize the proportion of intake flow that passes through said straight passage, irrespective of the operational conditions of the engine; while when the temperature of said engine is greater than said certain value or said fuel injection amount increase ratio is less than said certain value, said intake passage switchover control valve system is controlled so as to alter the proportions of intake flow that pass through said straight passage and said helical passage, according to the operational conditions of the engine.

* * * * *